United States Patent Office 2,846,418
Patented Aug. 5, 1958

2,846,418

PROCESS FOR THE PRODUCTION OF POLYMERISATION PRODUCTS

Hellmut Bredereck, Stuttgart, and Erich Bäder, Hanau (Main), Germany, assignors to W. C. Heraeus G. m. b. H., Hanau (Main), and Deutsche Gold- und Silber-Scheideanstalt vormals Roessler, Frankfurt am Main, Germany, both corporations of Germany No Drawing. Application November 12, 1953
Serial No. 391,726

Claims priority, application Germany November 13, 1952

19 Claims. (Cl. 260—80)

Sulphinic acids have already been proposed for the polymerisation of organic substances at comparatively low temperatures. These substances to some extent show a considerable efficacy, but have the disadvantage that they are unstable.

In their prior application Serial No. 274,822, the applicants have shown that salts of sulphinic acids with organic bases, more especially with primary and secondary amines, are highly effective in the polymerisation of unsaturated organic compounds and are very stable.

However, these sulphinic acid salts still cannot be stored entirely satisfactorily.

The inorganic salts of sulphinic acids, such as the alkali salts or the alkaline-earth salts, are completely stable, but are without substantial effect on the polymerisation, for example in block polymerisation. For example, with a mixture of one part monomeric methyl methacryl acetate and two parts polymeric methyl methacrylate, such as is customary for the production of shaped elements in the dental art, no hardening takes place for several hours at room temperature upon adding the sodium salts of p-toluene sulphinic acid. Furthermore, supplements of peroxides, for example, dibenzoyl peroxide, do not produce any thorough hardening of the material within useful periods under the conditions indicated.

It has now been found that polymerisation products of polymerisable organic compounds, advantageously compounds with a double bond terminal methylene group, can be produced at low temperatures in the shortest possible time if inorganic salts of sulphinic acid are used in conjunction with salts of organic bases, more especially organic amines, as polymerisation accelerators.

The process of polymerisation according to the invention is adapted to be employed on a wide variety of polymerisable organic compounds. The substances to be polymerised are more especially compounds with a double bond methylene group, as follows: unsaturated hydrocarbons of aliphatic nature, for example butadiene, phenyl acetylene or derivatives thereof, for example chlorobutadiene, or those of aromatic nature, for example styrene or divinyl benzene, derivatives of vinyl alcohol, for example vinyl chloride, vinyl acetate and other vinyl esters or vinyl ethers; preferably acrylic acid or substitution products thereof, for example methacrylic acid or derivatives thereof, for example esters, ethers, amines or nitriles; allyl compounds, such as diallyl diglycol carbonate or triallyl cyanurate. However, it is also possible to polymerise compounds in which the double bond is not at the end of the chain, as with those cited, but is at another position, for example, crotonic acid or derivatives thereof.

Inorganic sulphinic acid salts are, on the one hand, employed as polymerisation accelerators. All salts may be used which can be employed economically and do not cause any discoloration of the polymerisation products. In practice, there are primarily to be employed the alkali salts, for example the sodium or potassium salt, and the alkaline-earth salts, for example the magnesium salt of benzene sulphinic acid or p-toluene sulphinic acid. It is, however, also possible to use salts of aliphatic sulphinic acids, for example, octyl sulphinic acid.

As additional components in the novel polymerisation accelerators, there are employed, as already indicated, salts of organic bases, more especially organic amines. In this connection, the hydrochlorides of aromatic or aliphatic amines have been successful, more especially hydrochlorides of amines which form sulphinic acid salts which crystallise poorly.

However, since an undesirable clouding of the polymer frequently occurs when using the indicated hydrogen halides as polymerisation accelerators, which clouding is probably to be attributed to the inorganic halide being formed by double decomposition according to the following equation:

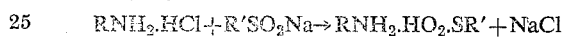

it is particularly advantageous to employ, in place of the hydrogen halides, salts of organic bases, more especially organic amines, with other acids.

In this connection, it is possible to employ salts of inorganic acids, for example of sulphuric acid, nitric acid or phosphoric acid. It is more advantageous to use amine salts of organic acids. In this connection, it is surprising that in many cases the polymerisation proceeds favourably when using amine salts of organic acids which have an acidity lower than that of the mineral acid. Particular advantages are obtained by using salts of unsaturated acids, for example maleic acid, acrylic acid or methacrylic acid.

Instead of using the salts, it is also possible to employ mixtures of organic bases and acids, which mixtures may contain one of the components in excess. In accordance with this embodiment of the process according to the invention, it is particularly advantageous to use an excess of unsaturated organic acids, especially when it is a question of acids which themselves participate in the polymerisation reaction and may be included in the polymer. Accordingly, it is of great advantage to use acrylic acid or maleic acid in very great excess with respect to the organic base. It is a peculiar fact that the acids by themselves do not have an effect of accelerating polymerisation. In this case, however, quite small supplements of organic bases or their salts are sufficient to produce a strong polymerisation-promoting effect of the entire system. According to this form of the process, it is possible also to use hydrogen halides as supplements of salts of organic bases in extremely small quantities. This embodiment is particularly surprising, since acids which are normally not able to precipitate sulphinic acid from the aqueous solution of inorganic sulphinates, such as acrylic acid, methacrylic acid, formic acid and acetic acid, have also proved to be effective in this case.

An additional advantage of this embodiment of the process is that it is also possible to use salts of an aromatic amine. Salts of aromatic amines generally yield better products than salts of aliphatic amines. The presence of aromatic amines in any form, even the combined form, always produces, however, the danger of a certain instability, which is shown by a discoloration of the polymerisation products. Since it is possible to employ exceptionally small quantities of aromatic amines or their salts (0.05 to 0.1%) in the presence of a large excess of organic acid, no regard need be paid to the instability of these compounds.

In general, the polymerisation accelerators to be employed in accordance with the invention are sufficient in order to carry out the polymerisation at room temperature or slightly elevated temperature in periods of 4 to 20 minutes. It may, however, be expedient to carry out the polymerisation in the presence of polymerisation catalysts which contain oxygen, such as oxygen, air, inorganic or organic peroxy compounds, and which are known per se. The quantity of peroxide which may best be added differs considerably in different cases and depends mainly upon the nature of the salt or organic bases to be employed, more especially the organic amines. When working with hydrochlorides of aromatic or heterocyclic bases, even the smallest possible quantity of peroxide is sufficient, such as is in any case contained in most polymerisation powders. When employing halides of aliphatic amines, it is, on the contrary, advisable to add 0.1–5% of peroxide.

The addition of peroxide may, however, also be without any effect. p-p'-Dichlorobenzoyl peroxide has proved particularly satisfactory in addition to the inorganic sulphinate as regards keeping power.

two parts to be stored separately. To improve the storage life, it is expedient to add the salt of the organic base and/or the acid to the liquid, while the inorganic salts of the sulphinic acid are added to the polymer. If the operation is carried out, not with salts of organic bases with acids, but with mixtures of these bases with acids, it is possible to arrange one of the two components in the polymer, and the other in the constituent to be polymerised.

EXAMPLES

*Example 1*

The monomeric methyl ester of methacrylic acid, containing 3% methanol, 0.0006% hydroquinone and 1 gamma $Cu^{++}$/cc., was polymerised in the presence of its polymer in the ratio of 1 cc. monomer to 2 gm. polymer in the presence of different sulphinic acid salts and different hydrochlorides of organic bases. The polymerisation was carried out, sometimes without addition and sometimes with addition of 2% benzoyl peroxide. The results are apparent from the following table, in which "time" represents the duration of the polymerization in minutes and "Max." represents the maximum temperature reached in degrees centigrade.

| Metal salt | Hydrochloride of— | with peroxide | | without peroxide | |
|---|---|---|---|---|---|
| | | Time | Max. | Time | Max. |
| sodium salt of benzene sulphinic acid. | ethyl/aniline | | | 5.75 | 56.9 |
| | benzyl methyl amine | 11 | 54.9 | | |
| | aniline | | | 6 | 49 |
| | p-toluidine | 5 | 47.5 | 4.5 | 52.2 |
| | ethyl aniline | 4 | 58.5 | 4 | 57.7 |
| | diphenyl amine | | | 4.5 | 49.3 |
| | tetrabase (4,4'-tetramethyl diamino diphenyl methane). | | | 7.5 | 41 |
| | p-amino dimethyl aniline | | | 6.75 | 46.8 |
| | m-phenylene diamine | | | 6.75 | 46.2 |
| sodium salt of p-toluene sulphinic acid. | monomethyl amine | 35 | 27.1 | | |
| | monobutyl amine | 9.75 | 46 | | |
| | benzyl amine | 8.25 | 49.3 | 16 | 39 |
| | cyclohexyl amine | 8.75 | 47.5 | | |
| | dibutyl amine | 5.75 | 52.5 | 18 | 39.9 |
| | benzyl methyl amine | 6.5 | 54 | 12.5 | 45.9 |
| | triethyl amine | 7.75 | 50.6 | | |
| | 2-dimethyl amino thiazol | | | 4.75 | 59.7 |
| | 4,5-diethyl imidazole | 12 | 43.2 | 13 | 38.4 |
| | betaine | | | 12 | 46.5 |
| | octyl isothiourea | 9.25 | 39.1 | | |
| magnesium salt of octyl sulphinic acid. | diphenyl amine | | | 6 | 45.5 |

In order still further to favour the polymerisation, additional active substances may be added to the batches to be polymerised, in addition to the accelerators according to the invention. For example, it is expedient to add alcohols to the polymerisation batches, either non-polymerisable monovalent saturated alcohols, such as are described in the prior application Serial No. 274,821, or polyhydric aliphatic and aromatic non-polymerisable alcohols.

Furthermore, the addition of small quantities of heavy metals or their compounds, more especially salts, has proved satisfactory, such addition forming the subject of the prior application Serial No. 297,758 of the applicants.

Various type of known polymerisation processes may be employed. The process according to the invention has proved most satisfactory with block polymerisation. In many cases, it is expedient to carry out the polymerisation in the presence of already polymerised constituents of the compound to be polymerised. In this case, it is possible to use mixture of powdered polymers with liquid or dissolved monomers or partially polymerised compounds. Polymerisation batches for this form of polymerisation according to the invention, which is particularly expedient in the dental field, consist of

*Example 2*

1 part of the monomeric methyl ester of methacrylic acid, containing 1% dimethyl-p-toluidine-maleinate, 2% methanol and 4 gamma $Cu^{++}$ per ml., is stirred at room temperature with about 1.7 parts of the polymeric methyl ester of methacrylic acid, containing 1.6% of the sodium salt of p-toluene sulphinic acid and 0.4% benzoyl peroxide. The main part of the batch is poured into a metal vessel with a diameter of about 17 mm. and a height of 4 mm. and the course of the temperature followed on a thermometer. After about 6 to 6½ minutes, a maximum temperature of about 55° C. is reached. The rest of the batch is cast immediately after the stirring in a special mould into a layer about 0.6 mm. thick and the hardness of the sheet thus formed is tested. After 12 minutes a hardness is achieved which is sufficient to permit of mechanical working by drilling, grinding and the like. Within a day, the hardness has increased to about three times the value.

A test member produced in accordance with the example was irradiated for four hours by a 835 Watt quartz lamp at a distance of 25 mm. No yellowing became apparent, not even after boiling for three hours in water.

Corresponding results with the same batch, but with the choice of other salts of organic bases, are to be seen in the following table:

| Salt | Polymerisation | | | |
|---|---|---|---|---|
| | with peroxide supplement | | without peroxide supplement | |
| | Polym. time in min. | Temp., Max., °C. | Polym. time in min. | Temp., Max., °C. |
| Aniline sulphate | 10 | 30.5 | 10 | 40 |
| Methyl aniline sulphate | 9 | 43.6 | 11 | 41.5 |
| Dimethyl aniline sulphate | 11 | 41.5 | | |
| Methyl - phenyl - ethanolamine sulphate | | | 19 | 36.4 |
| Benzyl amine sulphate | 17 | 38.8 | 30 | mild |
| Dibutyl amine sulphate | 10.5 | 57.5 | | |
| Aniline nitrate | 13.5 | 34.2 | 11 | 32.8 |
| Methyl aniline nitrate | 7 | 52.2 | 6.5 | 52.8 |
| Benzyl amine nitrate | 25 | 31.5 | 28 | mild |
| Aniline p-toluene sulphonate | 14 | 31.8 | 10 | 39.8 |
| Dimethyl-p-toluidine p-toluene sulphonate | 8 | 50.8 | 6.5 | 56.5 |
| Benzyl amine p-toluene sulphonate | 30 | 29 | | |
| Aniline phosphate | 50 | mild | 13 | 46.5 |
| Aniline oxylate | | | 16 | 34.6 |
| Aniline trichloracetate | 16 | 40.5 | 30 | 38.4 |
| Dimethyl aniline trichloracetate | 9.5 | 57.2 | 11 | 46.4 |
| Dimethyl-p-toluidine trichloracetate | 7 | 59.8 | 9 | 54.4 |
| Methyl-phenyl-ethanolamine trichloracetate | | | 20 | 41.8 |
| Aniline maleate | 16 | 37 | 30 | mild |
| Methyl aniline maleate | 11.5 | 35.5 | 11 | 55 |
| Ethyl aniline maleate | 7 | 56.8 | 8.5 | 52.5 |
| Dimethyl aniline maleate | 9 | 50 | 9.5 | 45.5 |
| Dimethyl-p-toluidine maleate | 6.75 | 58 | 8 | 53.2 |
| 4,4'-tetramethyl-diaminodiphenyl methane maleate | | | 9 | 42.6 |
| Methyl-phenyl-ethanolamine maleate | 12 | 47.2 | 12 | 55.5 |

*Example 3*

1 part of the monomeric methyl ester of methacrylic acid, containing the quantity indicated in the table of an acid or a salt, 2% methanol and 8 gamma Cu$^{++}$ per ml., was polymerised with about 1.7 parts of the polymeric methyl ester of methacrylic acid, containing 1.6% of the sodium salt of p-toluene sulphinic acid and 0.4% benzoyl peroxide. The results are to be seen from the following table:

| Acid | Salts or basic components | Polym. time in min. | Temp., Max., °C. |
|---|---|---|---|
| 10% acrylic acid | 0.1% dimethyl-p-toluidine | 7 | 55.5 |
| about 2% maleic acid | 0.1% dimethyl-p-toluidine | 10 | 43 |
| about 2% formic acid | 0.1% dimethyl-p-toluidine | 8.5 | 50.4 |
| about 2% glacial acetic acid | 0.1% dimethyl-p-toluidine | 13 | 50.5 |
| no acid | 0.1% dimethyl-p-toluidine | 21 | 43.5 |
| no acid | 0.1% triethylamine.HCl | no thorough hardening | |
| 10% acrylic acid | no salt | no thorough hardening | |
| 10% acrylic acid | 0.1% triethylamine.HCl | 6.5 | 50.2 |
| about 2% maleic acid | 0.1% triethylamine.HCl | 5.75 | 57.7 |
| about 2% p-toluene sulphonic acid | 0.1% triethylamine.HCl | 16 | 33.8 |
| about 2% trichloracetic acid | 0.1% triethylamine.HCl | 16 | 45 |

What we claim is:

1. In the process of bulk polymerizing a polymerizable vinyl compound having a terminal double bond linked to a methylene group, in the presence of a formed polymer of said vinyl compound, the improvement which comprises effecting the polymerization in the presence of a salt of an organic amine and a member selected from the group consisting of alkali and alkaline earth salts of a sulfinic acid.

2. Improvement according to claim 1, in which said group member is a sodium salt of a sulfinic acid.

3. Improvement according to claim 1, in which said salt of an organic amine is a hydrochloride salt.

4. Improvement according to claim 1, in which said salt of an organic amine is a salt of an organic amine with an organic acid.

5. Improvement according to claim 4, in which said salt of an organic amine is an unsaturated organic acid salt.

6. Improvement according to claim 5, in which said unsaturated organic acid salt is a salt of an acid selected from the group consisting of maleic acid, acrylic acid and methacrylic acid.

7. Improvement according to claim 1, in which said vinyl compound is a member selected from the group consisting of acrylic acid and derivatives thereof.

8. Improvement according to claim 1, in which said polymerization is effected in the additional presence of a non-polymerizable monovalent saturated alcohol.

9. Improvement according to claim 1, in which said polymerization is effected in the additional presence of a member selected from the group consisting of heavy metals and salts thereof.

10. Improvement according to claim 1, in which said polymerization is effected in the additional presence of an oxygen containing polymerization catalyst selected from the group consisting of oxygen, air, inorganic peroxy compounds and organic peroxy compounds.

11. In the process of bulk polymerizing polymerizable vinyl compounds having a terminal double bond linked to a methylene group in the presence of a formed polymer of said vinyl compound, the improvement which comprises effecting the polymerization in the presence of a member selected from the group consisting of alkali and alkaline earth salts of a sulfinic acid and a mixture of an organic amine and an acid.

12. Improvement according to claim 11, in which said acid is an unsaturated organic acid.

13. Improvement according to claim 11, in which said acid is a member selected from the group consisting of maleic acid, acrylic acid and methacrylic acid.

14. Improvement according to claim 13 in which said acid is present in amounts in excess of said amine.

15. Improvement according to claim 14 in which said polymerization is effected in the additional presence of a hydrogen halide of said amine.

16. Improvement according to claim 11, in which said polymerization is effected in the additional presence of an oxygen containing polymerization catalyst selected from the group consisting of oxygen, air, inorganic peroxy compounds and organic peroxy compounds.

17. Improvement according to claim 11, in which said polymerization is effected in the additional presence of a non-polymerizable monovalent, saturated alcohol.

18. Improvement according to claim 11, in which said polymerization is effected in the additional presence of a member selected from the group consisting of heavy metals and salts thereof.

19. Improvement according to claim 11, in which said polymerizable vinyl compound is a member selected from the group consisting of acrylic acid and derivatives thereof.

References Cited in the file of this patent

UNITED STATES PATENTS

| | | |
|---|---|---|
| 2,305,025 | Muhlhausen | Dec. 15, 1942 |
| 2,519,135 | Jacobson | Aug. 15, 1950 |
| 2,560,694 | Howard | July 17, 1951 |
| 2,567,803 | Caston et al. | Sept. 11, 1951 |
| 2,610,965 | Vandenberg | Sept. 16, 1952 |